US010380460B2

United States Patent
Qian et al.

(10) Patent No.: US 10,380,460 B2
(45) Date of Patent: Aug. 13, 2019

(54) DESCRIPTION OF CONTENT IMAGE

(71) Applicant: Lenovo (Singapore) Pte. Ltd., Singapore (SG)

(72) Inventors: Ming Qian, Cary, NC (US); John Weldon Nicholson, Cary, NC (US); Song Wang, Cary, NC (US); David Alexander Schwarz, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 32 days.

(21) Appl. No.: 15/604,083

(22) Filed: May 24, 2017

(65) Prior Publication Data

US 2018/0341834 A1 Nov. 29, 2018

(51) Int. Cl.
*G06F 3/16* (2006.01)
*G06K 9/62* (2006.01)

(52) U.S. Cl.
CPC ........... *G06K 9/6267* (2013.01); *G06F 3/167* (2013.01)

(58) Field of Classification Search
CPC .............. H04M 2250/74; H04M 3/533; G06F 17/30026; G10L 15/22
USPC ........ 382/115, 116, 118, 124, 128, 170, 209, 382/219, 278, 305; 704/235, 246, 275
See application file for complete search history.

(56) References Cited

U.S. PATENT DOCUMENTS

| | | | | |
|---|---|---|---|---|
| 6,397,186 | B1 * | 5/2002 | Bush ...................... | G06F 3/167 704/274 |
| 6,408,301 | B1 * | 6/2002 | Patton ............... | G06F 17/30265 707/741 |
| 6,943,665 | B2 * | 9/2005 | Chornenky ......... | G07C 9/00111 283/70 |
| 7,080,014 | B2 * | 7/2006 | Bush ...................... | G06F 3/167 704/275 |
| 7,167,543 | B2 * | 1/2007 | Bennett, III ........... | H04M 11/04 379/37 |
| 7,249,023 | B2 * | 7/2007 | Pyle ........................ | G10L 15/26 702/60 |
| 7,590,541 | B2 * | 9/2009 | Virji ....................... | G10L 15/26 700/17 |
| 7,721,301 | B2 * | 5/2010 | Wong ..................... | G10L 15/26 455/563 |
| 7,856,248 | B1 * | 12/2010 | Fujisaki ................ | H04M 1/575 455/414.1 |

* cited by examiner

*Primary Examiner* — Yosef Kassa
(74) *Attorney, Agent, or Firm* — Ference & Associates LLC

(57) ABSTRACT

One embodiment provides a method, including: receiving, at an information handling device, user input, wherein the user input comprises an indication to perform a function associated with content comprising at least one image; analyzing, using a processor, the at least one image to determine at least one characteristic associated with the at least one image; and providing, based on the analyzing, output describing the at least one characteristic of the at least one image. Other aspects are described and claimed.

18 Claims, 5 Drawing Sheets

DESCRIPTION OF CONTENT IMAGE

BACKGROUND

Information handling devices ("devices"), for example smart phones, tablet devices, laptop computers, personal computers, and the like, may be capable of receiving and processing user command inputs, for example, input via an audio capture device, manual input device, and the like. Generally, for a voice command, a user interacts with a voice input module, for example, embodied in a personal assistant, through use of natural language. The personal assistant allows a device to receive voice inputs (e.g., voice commands, etc.), process those requests, and perform the user's desired actions by carrying out the requested action itself or delegating user requests to a desired application.

BRIEF SUMMARY

In summary, one aspect provides a method, comprising: receiving, at an information handling device, user input, wherein the user input comprises an indication to perform a function associated with content comprising at least one image; analyzing, using a processor, the at least one image to determine at least one characteristic associated with the at least one image; and providing, based on the analyzing, output describing the at least one characteristic of the at least one image.

Another aspect provides an information handling device, comprising: a processor; a memory device that stores instructions executable by the processor to: receive user input, wherein the user input comprises an indication to perform a function associated with content comprising at least one image; analyze the at least one image to determine at least one characteristic associated with the at least one image; and providing, based on the analyzing, output describing the at least one characteristic of the at least one image.

A further aspect provides a product, comprising: a storage device that stores code, the code being executable by a processor and comprising: code that receives user input, wherein the user input comprises an indication to perform a function associated with content comprising at least one image; code that analyzes the at least one image to determine at least one characteristic associated with the at least one image; and code that provides, based on the code that analyzes, output describing the at least one characteristic of the at least one image.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
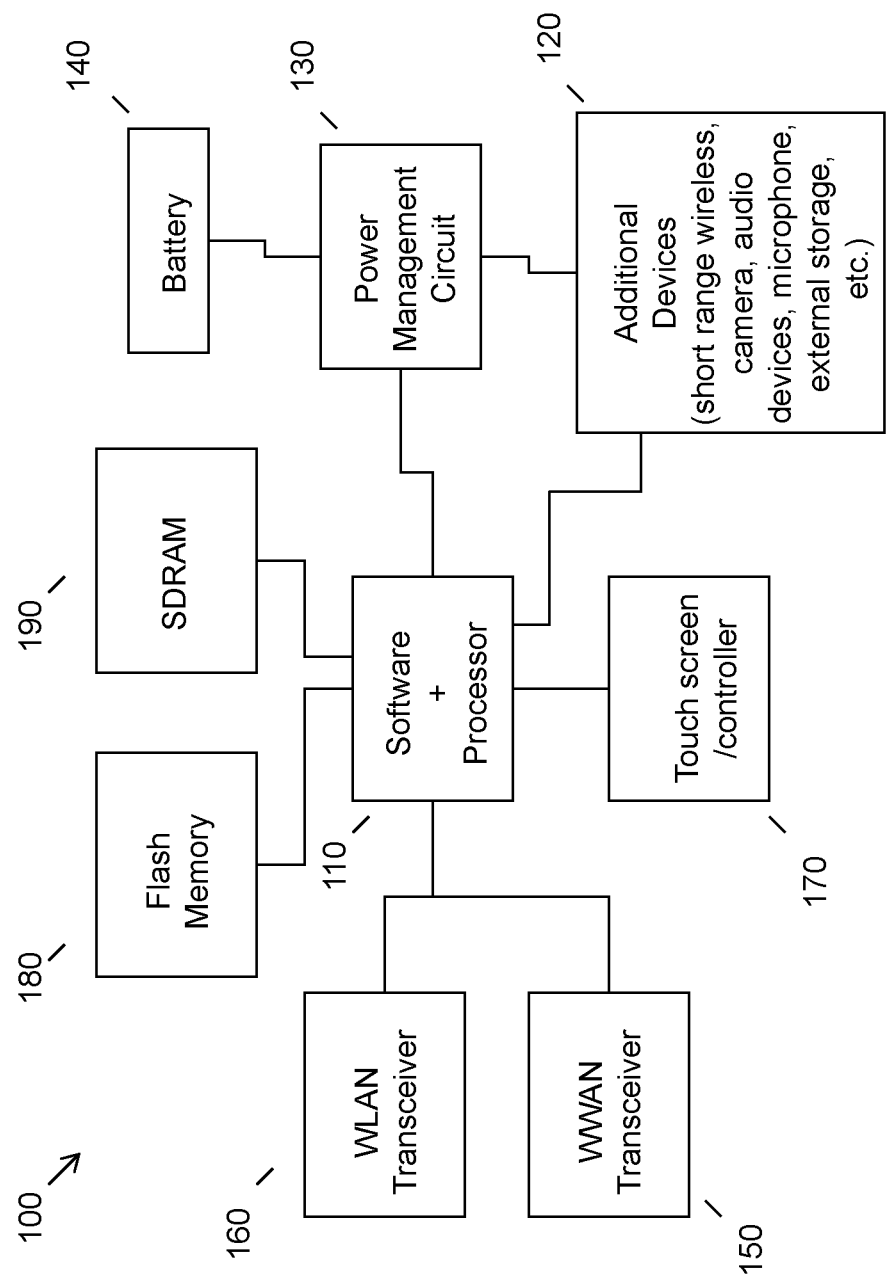
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Users frequently utilize devices to execute a variety of different commands. One method of interacting with a device is to use digital assistant software employed on the device (e.g., Siri® for Apple®, Cortana® for Windows®, Alexa® for Amazon®, etc.). A common command received by digital assistants is to output the contents of a particular file or content (e.g., an electronic book, an article, a website, a social media post, etc.). Oftentimes, the content may contain one or more images.

Conventionally, providing output of images is done through a display screen associated with the device. However, these conventional methods require both a display screen and a user to interact with the display screen to visualize the displayed contents. Some systems may not include a display screen, for example, a standalone digital assistant device may not include a dedicated display screen, a smart speaker, and the like. Additionally, even if a device includes or has access to a display, a user may be unable to interact with the display. For example, a user may be engaged in an activity where either their hands, visual focus, or both are required elsewhere (e.g., while driving, exercising, etc.). In another example, a user may be blind, or have limited vision, and may be unable to see, identify, and/or understand the displayed content. There are currently no existing solutions capable of assisting a user in visualizing the contents of an image without using a display screen.

Accordingly, an embodiment provides a method for audibly describing characteristics associated with an image. In an embodiment, user input comprising an indication to perform a function on or associated with content may be received at a device. The content may contain at least one image (e.g., picture, graph, chart, icon, video, etc.). Subsequent to receiving the user input, an embodiment may analyze an image in the content to determine characteristics associated with the image (e.g., individuals in the image, objects in the image, origin date of the image, etc.). An embodiment may then provide output (e.g., audible natural language output, etc.) describing the determined characteristics associated with the image. Such a method may enable users to receive a description of an image in content when interacting with a device that is unable to display the image on a screen.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera. System 100 often includes a touch screen 170 for data input and display/rendering. System 100 also typically includes various memory devices, for example flash memory 180 and SDRAM 190.

Figure 2:
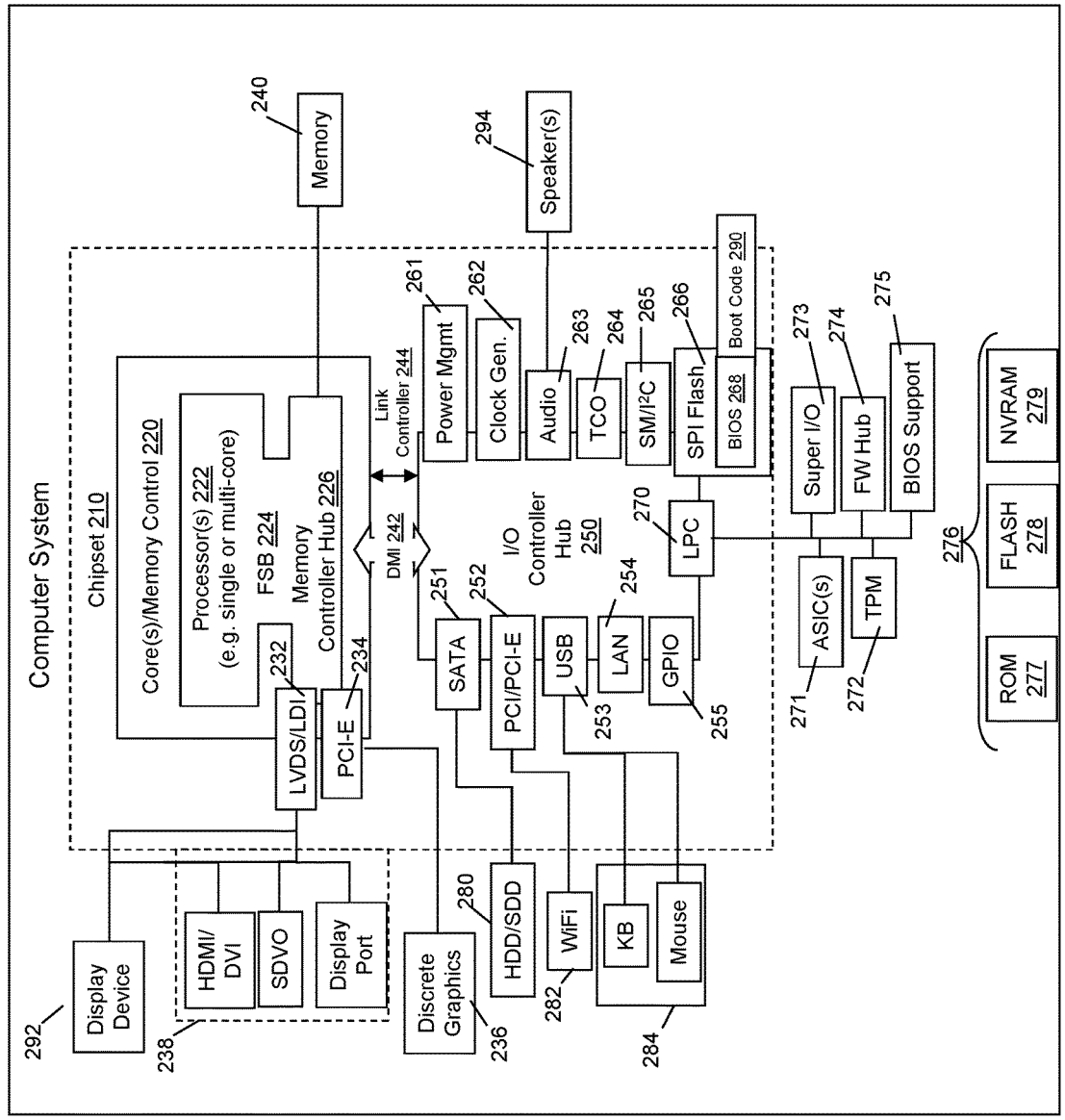
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which may include digital assistants that a user may interact with and that may perform various functions responsive to receiving user input. For example, the circuitry outlined in FIG. 1 may be implemented in a tablet or smart phone embodiment, whereas the circuitry outlined in FIG. 2 may be implemented in a personal computer embodiment.

Figure 3:
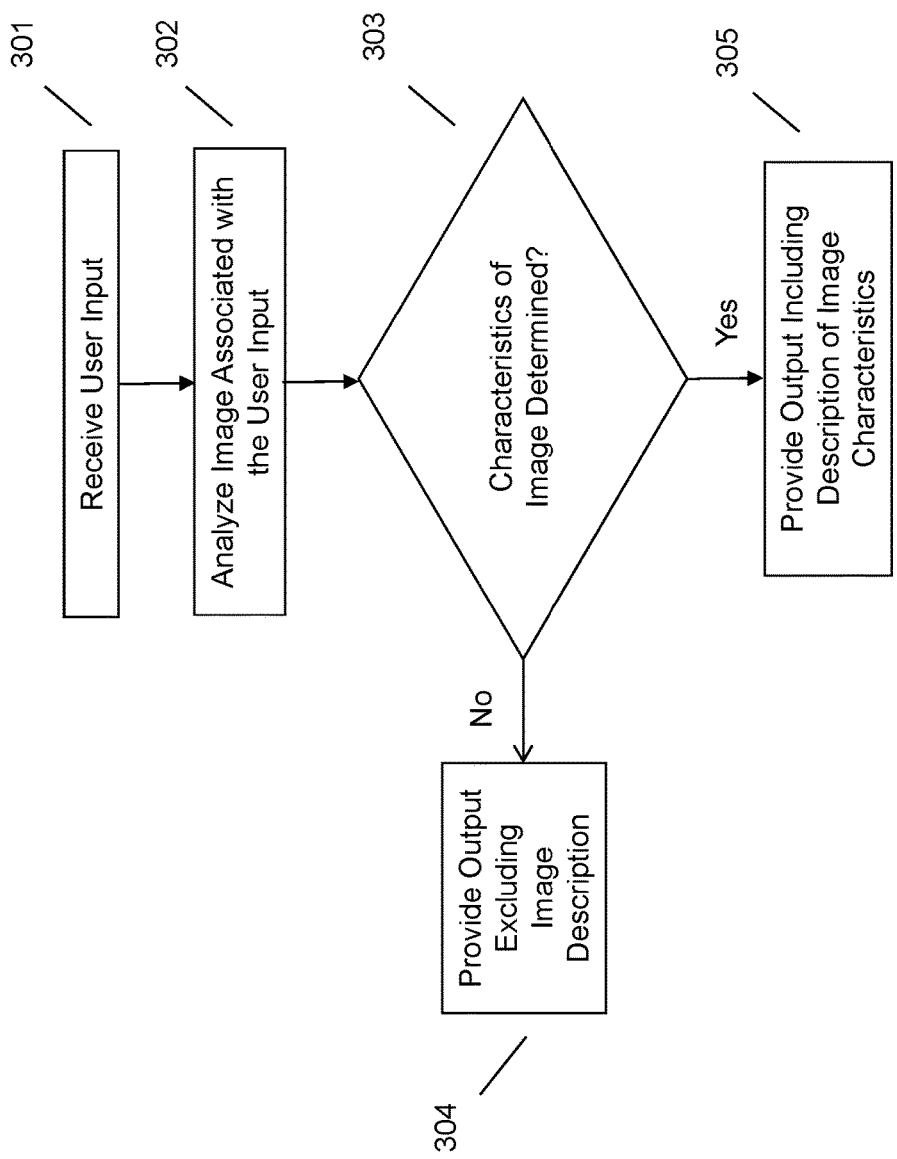
FIG. 3 illustrates an example method of describing an image present in content.

Referring now to FIG. 3, an embodiment may provide audible output describing characteristics associated with an image in a particular piece of content. At 301, an embodiment may receive input from at least one user. The input may be received at an input device (e.g., audio capture device, image capture device, video capture device, physical keyboard, on-screen keyboard, a digital assistant, etc.) and may be provided by any known method of providing input to an electronic device (e.g., voice input, gesture input, touch input, text input, etc.). In an embodiment, the input may be received at an electronic device that does not have a display screen. For ease of readability, the majority of the discussion herein will involve an electronic device without a display screen (e.g., a smart speaker such as Alexa® for Amazon®, etc.) and an input method comprising voice input provided to at least one audio capture device associated with the electronic device (e.g., a microphone, etc.). However, it should be understood that generally any user input method may be utilized and that the input may be provided to devices with or without display screens.

In an embodiment, the user input may be any type of input such as a command input, query input, and the like. The user input may contain an indication to perform a function associated with content (e.g., an electronic book, an article, a website, a social media post, a picture, a graph, etc.). For example, a user may ask a digital assistant to read a particular chapter in a book. Responsive to receiving this command, the digital assistant may access the appropriate chapter and may then audibly output the contents of that chapter. In an embodiment, the content may contain one or more images. For example, using the aforementioned example, the book may be a children's storybook and the chapter may contain a plurality of illustrations associated with the story. In another embodiment, the content may exclusively comprise an image(s). For example, the content may be a picture file displayed on an individual's social media account.

At 302, an embodiment may analyze an image in the content to determine characteristics associated with the image. The analysis may be conducted using at least one of a variety of image analysis methods. In an embodiment, the analyzing may comprise extracting the characteristics by accessing metadata associated with the content. For example, various images may be tagged with descriptive metadata that may provide a brief description related to the image contents, image origin date, global positioning coordinates associated with the image, and the like. The metadata may be included with the image at the time the image is generated or may be included at a later date, for example, a user may update the metadata with additional information after the image is generated.

In another embodiment, a system associated with a device may be trained to recognize various individuals, objects, and/or other characteristics associated with an image by feeding the system a large amount of images (e.g., millions of images, etc.) with labels describing what is in each of the images. For example, the system may be fed images of famous landmarks and people with information identifying the landmark and/or people. Subsequent to the training phrase, an embodiment may be capable of identifying certain characteristics of a newly presented image if that image contains characteristics the system has previously been exposed to and/or trained to recognize.

In yet another embodiment, various image processing techniques may be utilized in isolation or in conjunction with web search techniques to describe the people and/or objects in the image. For example, an embodiment may conduct a web-based image search on an image included in a content. The image search may be conducted using an image search engine (e.g., Google Images®, etc.). An embodiment may then use the results from the search to determine image characteristics. The aforementioned analysis methods may be used individually or in combination.

In an embodiment, responsive to identifying that at least one individual is present in the image, an embodiment may determine characteristics associated with the individual. For example, an embodiment may be able to determine an individual's gender (e.g., man, woman, etc.), mood (e.g., happy, sad, etc.), ethnicity (e.g., by examining skin tone, facial features, etc.), posture (standing, sitting, slouching, etc.), clothing (e.g., color of clothing, type of clothing, etc.), and the like. In an embodiment, responsive to identifying that at least one object is present in the image, an embodiment may be able to determine characteristics associated with the object. For example, an embodiment may be able to determine an object's name (e.g., an object's generic name, (e.g., a rock, bush, pie chart, line, etc.) or an object's formal name in the case of famous objects, (e.g., Eifel Tower, Mount Rushmore, Empire State Building, etc.), etc.), location (e.g., in the case of famous objects, the geographical locations of those famous objects, the object location relative to other objects or people in the image, etc.), color, size, and the like. In the case of a chart, graph, or other visual data representation object, the system may identify different chart features, for example, the chart legend, axes titles, colors of lines, resolution of the chart, and the like.

In an embodiment, the characteristics of the image may relate to other aspects of the image not necessarily related to the content pictured in the image. For example, additional image characteristics may comprise image capture date (e.g., the date when the image was captured, etc.), image capture location (e.g., where the image was captured, etc.), image title (e.g., a user-provided image title, etc.), and the like. These characteristics may be used to determine information related to the content of the image. For example, the system may identify the image capture location based on the metadata and correlate the image capture location to known geographical coordinates. The system may then identify a location where the image was captured.

If characteristics associated with the image can be determined at 303, an embodiment may provide, at 305, output including a description of the image. In an embodiment, the output may comprise natural language output and may be provided by an output device associated with the electronic device (e.g., a speaker, another output device, etc.). For example, an embodiment may audibly output the contents of an image to a user in a user's preferred language. In an embodiment, the output device may be integral to the device or may be located on another device. In the case of the latter, the output device may be connected via a wireless or wired connection to the device.

Figure 4:
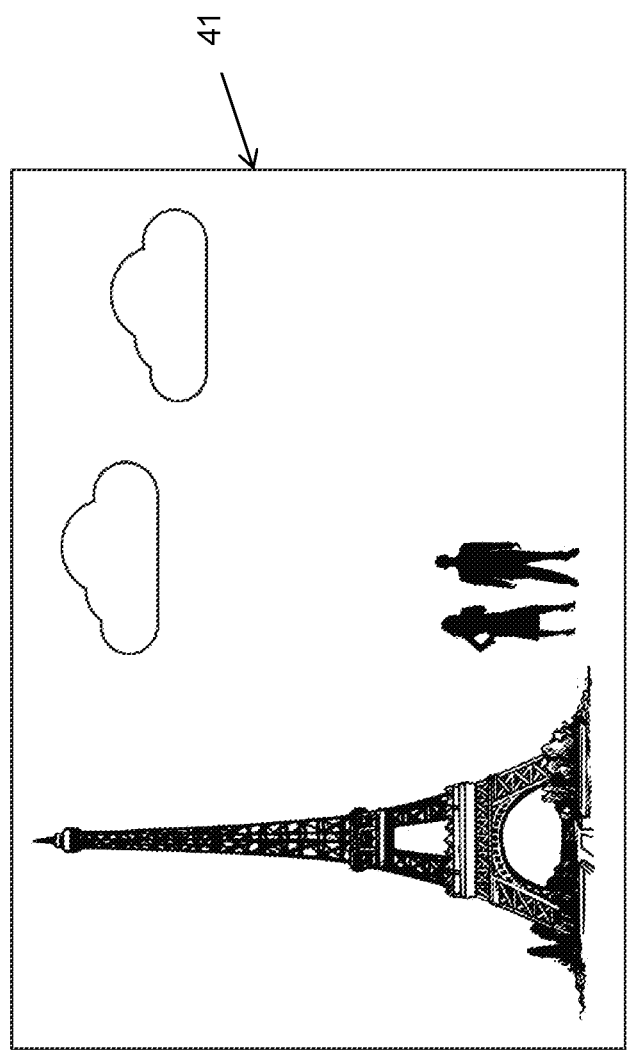
FIG. 4 illustrates an example of an image in content that may be vocally described.
Figure 5:
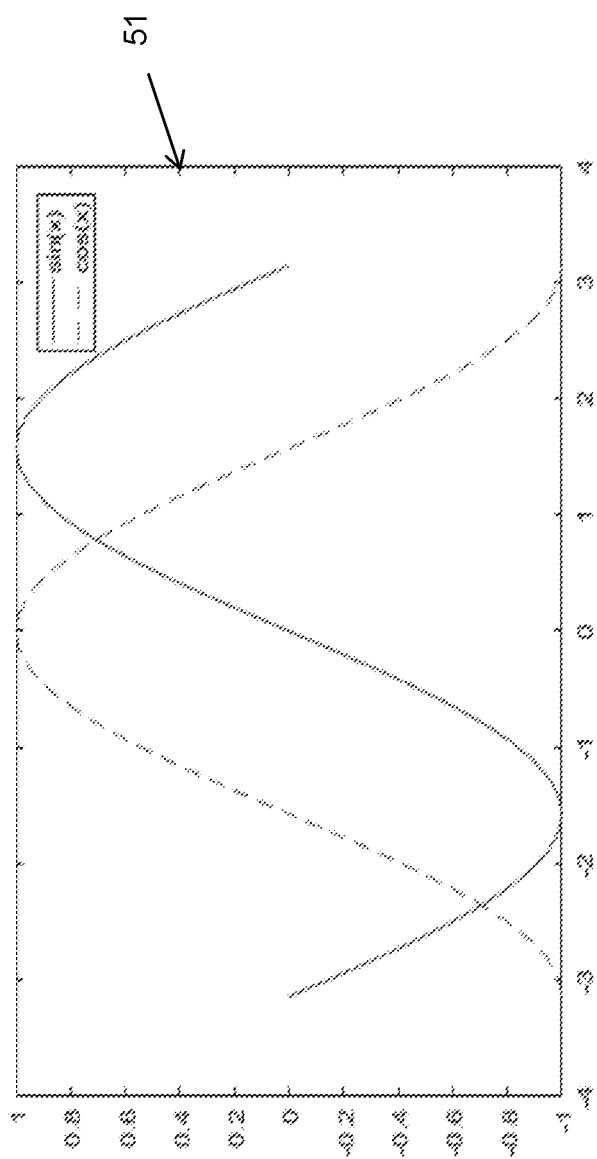
FIG. 5 illustrates an example of another image in content that may be vocally described.

Embodiments of the underlying application may be able to audibly describe the contents of an image. For example, FIG. 4 illustrates an example of an image 41 that may be found on a website. Responsive to receiving a user instruction to describe the contents of the website, or an image on the website in particular, an embodiment may determine characteristics associated with the image and then generate output including to the following: "This image shows two people, a man and a woman, standing near the Eiffel Tower on a partly cloudy day." As another example, referring now to FIG. 5, a graphical image 51 is illustrated. Responsive to receiving a user instruction to describe the contents of the image, an embodiment may generate output including to the following: "This figure shows two curves on a two-dimensional plot, one in a solid line and the other in a dotted line. The solid line is labeled 'sin (x)' whereas the dashed line is labeled 'cos (x)'." As can be recognized, the output may include a more detailed output than what is described herein. The level of detail provided in the output may be, at least partially, based upon the image, preferences of the user, complexity of the image, importance of the image to the understanding of the remaining content, and the like.

In an embodiment, prior to providing an image description, an embodiment may query a user as to whether they want to receive a description of a particular image in a document. Subsequent to receiving a positive response, an embodiment may then describe characteristics associated with the image to the user. An embodiment may also provide more specific output associated with an image's characteristics responsive to receiving subsequent user inputs. For example, subsequent to providing the aforementioned output associated with the image 41 in FIG. 4, an embodiment may receive additional user input such as "what are the two people wearing?", "where are the two people positioned in relation to the Eifel Tower?", "when was the image taken?", and the like. As another example, subsequent to providing the aforementioned output associated with the image 51 in FIG. 5, an embodiment may receive additional input such as "what is the x and y range on the graph?", "what is the shape of the lines?", and the like. An embodiment may process these subsequent user inputs and provide corresponding output.

In situations where the content contains at least two images, an embodiment may be able to determine which of the images, if any, to describe. For instance, a situation may arise where content may contain more than one image but only a single image is related to a user's input. For example, a website page may contain a plurality of advertisement related images disposed within and/or around the text of the webpage. An embodiment may determine (e.g., from context analysis, metadata attached to each of the images, etc.) that those advertisements are irrelevant to a user's input (e.g., if a user commands the device to read the contents of the webpage, etc.) and may ignore them when providing output. Alternatively, an embodiment may determine that all images are relevant to a user's input and may then provide output describing each of those images. In such a scenario, an embodiment may describe the images chronologically (e.g., as they appear in the document, etc.), in an order based on a relevance score (e.g., certain images may be more related to a user's input than other images and the more relevant images may be described first, etc.), and the like.

If characteristics associated with the images cannot be determined at 303, an embodiment may provide, at 304, output that does not include a description of an image. For example, responsive to a user command requesting a device to read a particular chapter in a book, if an embodiment determines that there are no images in that chapter, an embodiment may provide output only related to the text in the chapter. Alternatively, if an embodiment determines that there are images present in content but that those images are not related to a user's original input, an embodiment may ignore those images when providing output. As an additional example, the user may have provided previous input indicating that images should not be described. As a further example, the system may be unable to determine characteristics of the image using any image analysis techniques (e.g., the image may be corrupted, may include security features preventing image reading, etc.), and may therefore be unable to provide a description of the image.

The various embodiments described herein thus represent a technical improvement to conventional vocal recitation techniques. Specifically, the embodiments as described herein provide a technique for describing images that is not possible with conventional techniques. As discussed before, conventional techniques do not provide a description of the images, but rather skip the images or merely state that the content contains an image, but with no description of that image. Using the techniques described herein, an embodiment may analyze characteristics associated with an image and then subsequently provide output associated with those characteristics to a user. Such techniques enable users that may not be able to interact with a display screen, or that utilize a device without a display screen, to receive descriptive information related to images in content.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    receiving, at an information handling device, user input, wherein the user input comprises an indication to perform a function associated with content comprising at least one image;
    analyzing, using a processor, the at least one image to determine at least one characteristic associated with content appearing in the at least one image; and
    providing, based on the analyzing, audible natural language output describing the at least one characteristic associated with the content appearing in the at least one image.

2. The method of claim 1, wherein the analyzing comprises extracting the at least one characteristic from metadata associated with the content.

3. The method of claim 1, wherein the at least one image comprises at least one of at least one entity and at least one object.

4. The method of claim 3, wherein the at least one characteristic comprises at least one characteristic associated with the at least one entity selected from the group consisting of: entity mood, entity ethnicity, entity posture, and entity clothing.

5. The method of claim 3, wherein the at least one characteristic comprises at least one characteristic associated with the at least one object selected from the group consisting of: object name, object color, object size, and object location.

6. The method of claim 1, wherein the at least one characteristic comprises origin data associated with the at least one image.

7. The method of claim 1, wherein the content comprises two or more images.

8. The method of claim 7, further comprising determining which of the two or more images is a relevant image, wherein the relevant image is determined based upon the user input.

9. The method of claim 8, wherein the providing output comprises providing output associated with the relevant image.

10. An information handling device, comprising:
    a processor;
    a memory device that stores instructions executable by the processor to:
    receive user input, wherein the user input comprises an indication to perform a function associated with content comprising at least one image;
    analyze the at least one image to determine at least one characteristic associated with content appearing in the at least one image; and
    providing, based on the analyzing, audible natural language output describing the at least one characteristic associated with the content appearing in the at least one image.

11. The information handling device of claim 10, wherein the instructions executable by the processor to analyze comprise instructions executable by the processor to extract the at least one characteristic from metadata associated with the content.

12. The information handling device of claim 10, wherein the at least one image comprises at least one of at least one entity and at least one object.

13. The information handling device of claim 12, wherein the at least one characteristic comprises at least one characteristic associated with the at least one entity selected from the group consisting of entity mood, entity ethnicity, entity posture, and entity clothing.

14. The information handling device of claim 12, wherein the at least one characteristic comprises at least one characteristic associated with the at least one object selected from the group consisting of: object name, object color, object size, and object location.

15. The information handling device of claim 10, wherein the at least one characteristic comprises origin data associated with the at least one image.

16. The information handling device of claim 10, wherein the content comprises two or more images.

17. The information handling device of claim 16, wherein the instructions are further executable by the processor to determine which of the two or more images is a relevant image, wherein the relevant image is determined based upon the user input.

18. A product, comprising:
    a storage device that stores code, the code being executable by a processor and comprising:
    code that receives user input, wherein the user input comprises an indication to perform a function associated with content comprising at least one image;
    code that analyzes the at least one image to determine at least one characteristic associated with content appearing in the at least one image; and
    code that provides, based on the code that analyzes, natural language audible output describing the at least one characteristic associated with the content appearing in the at least one image.

* * * * *